July 6, 1954      K. E. GRESSLY      2,682,827
APPARATUS FOR STERILIZING FOODSTUFFS AND BEVERAGES
Filed June 24, 1950
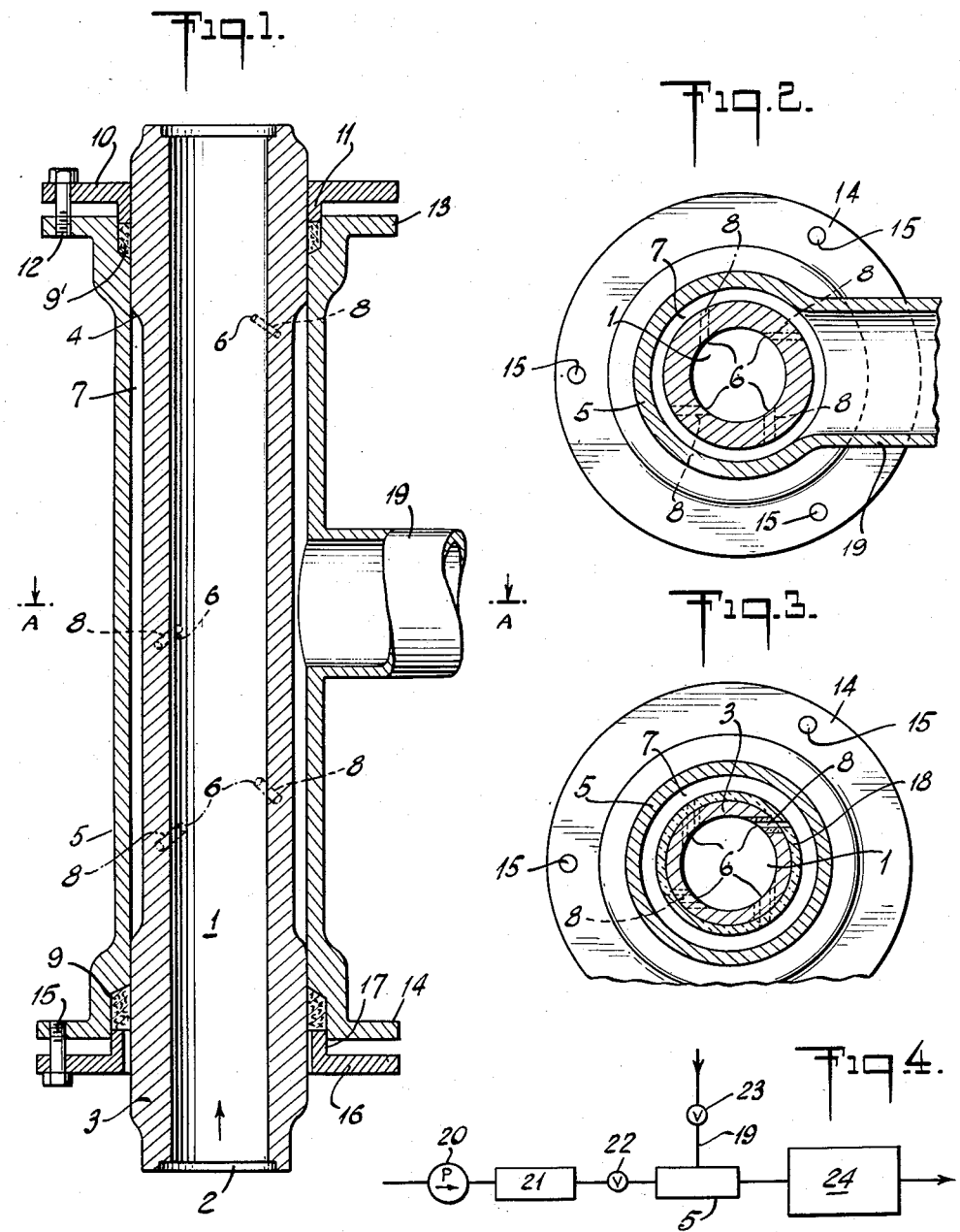
INVENTOR:
KUNO ETIENNE GRESSLY.
BY K. A. Mayr
ATTORNEY Patented July 6, 1954

2,682,827

UNITED STATES PATENT OFFICE 2,682,827

APPARATUS FOR STERILIZING FOODSTUFFS AND BEVERAGES

Kuno Etienne Gressly, Konolfingen, Switzerland, assignor to Ursina A. G., Konolfingen, Switzerland Application June 24, 1950, Serial No. 170,073

5 Claims. (Cl. 99—251)

The invention relates to a method for sterilising liquid foodstuffs and beverages, in which the liquid to be treated is conducted continuously at high pressure through a heating device, is heated for a brief time to above 100° C. by means of at least one gaseous or vaporous heat carrier introduced into the liquid, and is expanded in an expansion device by quickly reducing its pressure. The invention relates also to apparatus for carrying out the method.

Conventional methods for sterilising liquid foodstuffs and beverages, for instance pasteurizing fresh milk or cream, are based on a heating action of shorter or longer duration. It has been proposed to heat fresh milk for a short time by introducing steam at temperatures up to 150° C. under a correspondingly high pressure and, after termination of the heat treatment, to reduce the heating temperature along with reduction of the pressure in an expansion device. A conventional apparatus for sterilising milk has, for instance, a tube-like heating appliance, through which the milk to be treated is continuously conducted at a high pressure and is heated for a short time by means of steam which is introduced into the milk through a pipe extending thereinto. The conventional methods and the apparatus for performing the methods however, comprise serious drawbacks which have hitherto rendered successful sterilising impossible. Especially, it is not possible to prevent the treated liquids or certain of their constituents from suffering detrimental changes by the heating action. In particular, heat-resistant spore-forming organisms cannot be destroyed by the heat treatment, and it is thus impossible to preserve the treated liquid. The detrimental changes are evidenced, for instance, by a cooked taste or by the destruction of valuable vitamins. Especially when sterilising milk and liquids containing milk, there is danger that, if the flow conditions are unfavourable, some particles of milk may burn at places where they come into contact with inadmissibly highly heated metallic parts of the heating apparatus, and such milk is suitable for immediate consumption only or for the manufacture of milk products with the sacrifice of some essential qualities.

It is an object of the present invention to provide a method and an apparatus which permits perfect sterilising without impairing the valuable constituents of the liquid to be treated.

The method according to the invention is characterised by introducing at least one heat carrier into the liquid to be treated at the inner surface of a conduit through which the liquid is passed.

The apparatus according to the invention comprises a heating appliance having at least one passage for conducting the liquid, the inner surface of the passage having at least one inlet opening for the heat carrier and this opening being connected through a supply duct to a heat-carrier feed device.

Especially for sterilising milk and liquids containing milk, the duration of the heat treatment before lowering of the pressure in the expansion appliance can be reduced to less than one second. The liquid may be heated to a temperature of between 170 and 250° C.

Preferably the heat may be introduced at a plurality of points, which may be distributed over at least a part of the interior surfaces of the heating appliance along helical lines. The places where the heat carrier is introduced may, with increasing distance from the inlet for the liquid to be treated, have a decreasing cross-sectional area of flow or be at an increasing distance apart from each other.

Preferably the inlet passages for the liquid and the inlet openings for the heat carrier may be directed in such a way that the heat carrier introduced into the flow path of the liquid has a flow direction component coincident with the direction of the flow of the liquid. The interior surface of the passage may be formed as a surface of rotation, and the inlet passage and the inlet opening for the heat carrier may be directed in such a way that the inlet direction of the heat carrier into the liquid forms an acute angle with the plane containing the axis of the surface of rotation and the inlet opening.

Under certain circumstances, it will be found advisable to line with an insulating material at least some parts adjacent to the flow path of the heat carrier. Steam, if necessary in a superheated state, or carbon dioxide or nitrogen may be used as heat carrier.

The method according to the invention and the apparatus for carrying it out are described with reference to the following examples of execution and illustrated in the drawing, where:

Fig. 1 shows a longitudinal section through an apparatus according to the invention, Fig. 2 is a cross-section of the same apparatus on the line A—A in Fig. 1, Fig. 3 is a cross-section through a modified apparatus according to the invention, and Fig. 4 is a diagrammatic lay-out of a system embodying the invention.

In all figures, the same reference numerals have been given to the same parts.

The heating appliance (Fig. 1), which is suited particularly for sterilising milk and liquids containing milk, is provided with a straight passage 1, which has over its entire length a constant circular cross-sectional area of flow for the liquid to be treated. At the inlet opening 2 of the heating appliance, a connecting pipe (not shown in the drawing) is fixed, which serves for introducing into the heating apparatus the liquid to be treated. For maintaining a continuous flow in the passage 1, a delivery member, such as a pump 20 (Fig. 4), is arranged in the flow path of the liquid before it enters the device shown in Fig. 1. It is preferable, before heating the liquid in the heating appliance, to preheat it in a conventional heater indicated at 21 in Fig. 4 to, say, 100° C. The passage 1 is formed by a tube-shaped body 3 which has in a part of its outer wall a recess 4. The tube-shaped body 3 is inserted into a jacket pipe 5. Parts 3 and 5 are made of corrosion-resistant steel.

In accordance with the invention, the inner surface of the passage 1 is provided with a plurality of openings 6, which communicate through passages 8 with the hollow space 7 formed between the tube-shaped body 3 and the jacket pipe 5 by the recess 4. On the jacket pipe 5 a branch 19 is fitted through which high pressure steam is conducted into the hollow space 7 therefrom through the passages 8 and the openings 6 into the liquid flowing through the passage 1. The ratio of the quantity of liquid flowing through the passage per unit of time and the quantity of steam simultaneously introduced can be adjusted as desired by conventional flow regulating members 22 and 23. In this way, the temperature required for sterilising the various liquids to be treated can easily be adjusted. The temperature may, for instance, amount to 170° to 250° C. for treating milk and liquids containing milk, the adoption of temperatures of over 200° C. offering special advantages. The individual steam inlet openings 6 are distributed in helical lines on the inner wall of the passage 1, ensuring a uniform heating of all particles of the liquid. The supply passages 8 for the steam are inclined in the direction of flow of the liquid. Because of this, the heat carrier has a flow component coincident with the direction of flow of the liquid; this contributes essentially towards obtaining a uniform rate of flow of the liquid through the passage 1.

The jacket pipe 5 is widened out at both ends. In the annular spaces thereby formed, stuffing-boxes 9 and 9' are arranged; they prevent steam from issuing from the annular space 7.

The upper end of the tube-shaped body 3 is provided with a flange 10 having a sleeve portion 11 projecting into the annular widening of the jacket pipe 5 at the stuffing-box 9'. The flange 10 is connected by tension bolts 12 to a flange 13 arranged on the jacket pipe 5. The pull exerted by the bolts 12 tends to force the sleeve portion 11 against the packing material of the stuffing-box 9' and prevents the escape of steam from the hollow space 7. At the opposite end, the jacket pipe is provided with a flange 14, which is connected by means of tension bolts 15 to a flange 16 which is loose on the tube-shaped body 3. Flange 16 has a sleeve portion 17, which extends into the stuffing-box 9 and compresses the packing material therein.

The individual steam inlet openings 6 are formed in such a way that, with increasing distance from the inlet opening 2 of the passage 1, they have a decreasing flow area and are at an increasing distance apart from each other. It is thus possible to arrange that, in spite of reduced temperature difference between steam and liquid with increasing distance from the inlet opening of the passage 1, the reduced quantities of steam introduced through the last openings condense completely; this contributed considerably to obtaining a continuous flow of the liquid and therefore to uniform warming of all particles of the liquid.

The cross-section through the heating appliance illustrated in Fig. 2 is indicated in Fig. 1 by line A—A. The steam introduced through the branch 19 passes into the hollow space 7 confined between the tube-shaped body 3 and the jacket tube 5 and is conducted through the inlet passages 8 and the inlet openings 6 into the liquid flowing through the passage 1. The inlet passages 8 are so constructed that the direction in which the steam enters the passage 1 forms an acute angle with a plane containing the longitudinal axis of the passage and the corresponding inlet opening. This arrangement affords utilization of the kinetic energy of the introduced steam to impart a swirling motor to the individual liquid particles; this increases the turbulence of the liquid flow and contributes to attaining uniform heating of all liquid particles.

In order to avoid spoiling the liquid to be treated, the warming effect in the heating appliance must be followed by a rapid reduction of the temperature of the liquid. This is done advantageously by a sudden reduction of the pressure of the liquid in an expansion device 24 connected to the outlet opening of the passage 1; there the heated liquid is expanded to atmospheric pressure or to a slightly higher pressure. By utilising suitable vacuum equipment, the liquid can also be expanded to a pressure lower than atmospheric. In this way a quick reduction of the temperature of the liquid to the corresponding boiling point is effected, and the steam, which was introduced into the liquid and condensed, is removed. The speed of the liquid flow is adjusted by quantity regulation in such a way that the duration of the heat treatment of the liquid before lowering its pressure in the expansion device amounts to less than 1 second, which is sufficient, in the apparatus according to the invention, to destroy even the germs most resistant to heat.

By arranging the inlet openings for the heat carrier on the inner surface of the passage of the heating appliance according to the invention, it is possible to prevent separate liquid particles from remaining undesirably long in contact with the metal parts in the immediate vicinity of the inlet openings, which would cause the detrimental changes already mentioned. In particular, there will be no dead spaces in the liquid flow, where the speed and the turbulence of the liquid are diminished to such an extent that certain liquid particles remain in contact for any length of time with metal parts highly heated by the heat carrier and are therefore likely to be burned.

In certain cases it will be found advisable, by using material which is a poor conductor of heat, to diminish the heat transfer from the inner wall of the heat-carrier supply passages to neighboring metal parts which come into contact with the liquid. Fig. 3 shows such a construction in cross-section, the supply passages 8 and the outer surface of the tube-shaped body 3 bounding the hollow space 7 being lined with a heat-insulating material, for instance ceramic material.

The method according to the present invention affords treatment of liquid foodstuffs and beverages, in particular milk and liquids containing milk, without any detrimental changes in flavour or in composition, for preserving and retaining same in a state suitable for consumption for at least a week, provided that they are stored at temperatures below 10° C. and protected from air and possibly also from light, so that no after-infection may take place. Sweetened condensed milk, which has been heated in accordance with the method of the present invention to temperatures exceeding 200° C., proves to be stable during the whole lactation period, even in the case of compositions with a high content of dry substance free from fat, whereby after-thickening is reduced to a great extent. Fruit juices sterilised in accordance with the invention are particularly characterised by the fact that the valuable vitamins contained in them and their natural aroma are to a large degree retained. For treating fruit juices, it is advisable to use carbon dioxide or nitrogen as the heat carrier. Under certain circumstances it will be well to use different heat carriers, which are introduced into the liquid at two different places on the inner surface of the passage.

What I claim as new and desire to secure by Letters Patent is:

1. An apparatus for the heat treatment of liquid foodstuffs and beverages comprising a longitudinal conduit whose length is several times its transverse dimension, means for forcing the liquid to be sterilized into one end of said conduit and means for relieving the liquid at the other end of the conduit, said conduit having a wall having an interior surface, and conduit means in said wall for discharging a heating agent into the liquid, said conduit means comprising a plurality of discharge means terminating in said surface and being widely spaced longitudinally of said conduit, the spacing increasing as the distance of the discharge means from the end of the conduit receiving the liquid increases.

2. An apparatus for the heat treatment of liquid foodstuffs and beverages comprising a longitudinal conduit whose length is several times its transverse dimension, means for forcing the liquid to be sterilized into one end of said conduit and means for relieving the liquid at the other end of the conduit, said conduit having a wall having an interior surface, and conduit means in said wall for discharging a heating agent into the liquid, said conduit means comprising a plurality of discharge means terminating in said surface and being spaced longitudinally of said conduit, the flow area of said discharge means decreasing as the distance of the discharge means from the end of the conduit receiving the liquid increases.

3. An apparatus for the heat treatment of liquid foodstuffs and beverages, comprising a longitudinal conduit having an inlet for receiving and an outlet for discharging the liquid to be treated, the length of said conduit between said inlet and outlet being several times the transverse dimension of the conduit, said conduit having a wall having an interior surface, conduit means in said wall for discharging a heating agent into the liquid flowing in said conduit, said conduit means comprising a plurality of discharge means terminating in said surface and being positioned along a substantially helical imaginary line disposed coaxially of said conduit.

4. An apparatus for the heat treatment of liquid foodstuffs and beverages, comprising a longitudinal conduit having an inlet for receiving and an outlet for discharging the liquid to be treated, the length of said conduit between said inlet and outlet being several times the transverse dimension of the conduit, said conduit having a wall having an interior surface, conduit means in said wall for discharging a heating agent into the liquid flowing in said conduit, said conduit means comprising a plurality of discharge means terminating at widely spaced points in said surface and being inclined with respect to the longitudinal extension of said conduit.

5. An apparatus as defined in claim 4, the flow area of said conduit being circular and said discharge means being also inclined with respect to an imaginary plane containing the longitudinal axis of said conduit and the point where the discharge means terminates in said surface.

References Cited in the file of this patent

UNITED STATES PATENTS

| Number | Name | Date |
|---|---|---|
| 2,020,309 | Grindrod | Nov. 12, 1935 |
| 2,122,029 | Davis | June 28, 1938 |
| 2,122,954 | Rogers | July 5, 1938 |
| 2,130,643 | Hammer et al. | Sept. 20, 1938 |
| 2,130,644 | Hammer et al. | Sept. 20, 1938 |
| 2,238,373 | Rogers | Apr. 15, 1941 |
| 2,452,260 | Peebles | Oct. 26, 1948 |